Dec. 15, 1931.  R. C. BENNER ET AL  1,836,357
PROCESS FOR THE RECOVERY OF SULPHUR FROM SULPHUR DIOXIDE
Filed Nov. 2, 1927
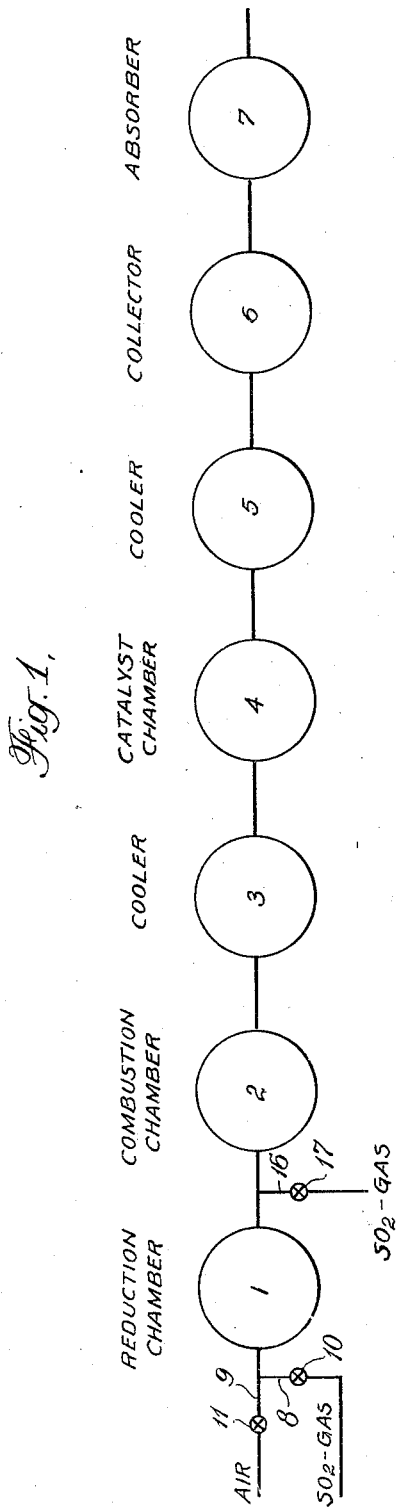
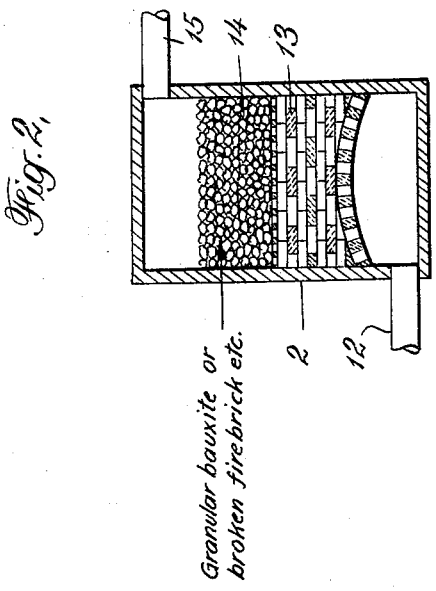
INVENTORS
Raymond C. Benner
Alfred Paul Thompson
BY
Forbes Sileby
ATTORNEY Patented Dec. 15, 1931

1,836,357

UNITED STATES PATENT OFFICE

RAYMOND C. BENNER, OF NIAGARA FALLS, AND ALFRED PAUL THOMPSON, OF LONG ISLAND CITY, NEW YORK, ASSIGNORS TO GENERAL CHEMICAL COMPANY, OF NEW YORK, N. Y., A CORPORATION OF NEW YORK

PROCESS FOR THE RECOVERY OF SULPHUR FROM SULPHUR DIOXIDE

Application filed November 2, 1927. Serial No. 230,524.

This invention relates to improvements in the process for the reduction of sulphurous gases to produce elemental sulphur and more particularly to improvements in the process for the reduction of sulphur dioxide in amount not substantially greater than 12% as it occurs in metallurgical gases by subjecting such sulphur dioxide gas to the reducing action of coal, coke, or other similar carbonaceous reducing agent at an elevated temperature to produce elemental sulphur.

The primary object of this invention is to provide a simple process for economically producing sulphur on a commercial scale. A further object is to provide a process wherein a maximum amount of sulphur is produced per unit of carbon consumed. A still further object is to provide a process which is easily controlled and in which a minimum amount of labor is required.

When sulphur dioxide gas is contacted with carbonaceous fuel, at an elevated temperature, the resulting products may contain any or all of the following constituents: elemental sulphur, hydrogen sulphide, sulphur dioxide, carbon monoxide, carbon dioxide, nitrogen, etc. The proportion of each of the several constituents will depend primarily upon the composition of the gas treated, the temperature of the fuel bed, the composition of the fuel, and the gas speed. The difficulty in controlling these several factors so that the gaseous products from the reduction chamber shall contain all of the sulphur in the elemental form or so that there shall be interacting proportions of reducing and reducible gases, is obvious. It has been proposed heretofore to regulate the composition of the gaseous products from the reduction chamber as closely as possible to provide for the reduction of substantially all of the sulphur dioxide therein, and to provide means for by-passing small, controlled amounts of sulphur dioxide around the reduction chamber to mix with the gaseous products therefrom which might contain reducing compounds such as carbon monoxide, hydrogen sulphide, etc., whereby the small but frequent variations in the composition of such products may be overcome and neutralized. This procedure did not, however, satisfactorily control the composition of the ultimate gaseous products of the reduction, and furthermore it provided for substantially the entire production of the elemental sulphur in the reduction chamber containing the carbonaceous fuel. This method, therefore, required very large chambers to handle the gas volumes encountered in the commercial production of sulphur, which large chambers were both costly to install and operate, and the process required a very considerable amount of labor. Furthermore, it is desirable to operate the reduction chamber at a temperature below the slagging point of the ash. Under such conditions an additional disadvantage of this scheme of operation was the failure to burn the soot and other solid carbonaceous matter present in the gaseous products from the reduction chamber, because of the insufficiently high temperature of the gases, which temperature was not greatly increased by the relatively small quantity of heat developed by the interaction of the gaseous reduction products with the small amount of sulphur dioxide gas added thereto.

We have discovered that these difficulties may be very largely overcome and an efficient process provided for the commercial production of elemental sulphur by the reduction with carbonaceous fuel of sulphur dioxide gas, especially relatively weak sulphur dioxide gas, if the several primary factors above mentioned are controlled to provide a large amount of reducing gas, particularly carbon monoxide, in the gaseous products from the interaction of the sulphur dioxide gas and carbonaceous fuel.

Accordingly, our invention consists in contacting sulphur dioxide gas with carbonaceous fuel under such conditions of time, temperature and gas composition that a major portion of the carbon it utilized in the production of carbon monoxide, that is, such that the ratio by volume of carbon monoxide to carbon dioxide in the gaseous products is not less than substantially 1 to 1 and preferably such that there is a greater volume of carbon monoxide than carbon dioxide, adding a regulated quantity of sulphur dioxide, preferably strong sulphur dioxide gas, to provide interacting proportions of reducing and reducible gases and causing the interaction of such mixed gases to produce elemental sulphur and to burn any soot or other solid carbonaceous matter. In this practice not only is the required capacity of the reduction chamber lowered, but a sufficiently high temperature is generated by the interaction of the relatively large amount of carbon monoxide with the sulphur dioxide subsequently added to bring about substantially complete consumption of soot and other solid carbonaceous matter.

As stated above, the composition of the gas treated, the temperature of the fuel bed, the composition of the fuel, and the gas speed primarily control the composition of the reduction products. Thus, by increasing the relative amount of free oxygen or the temperature of the fuel bed, or decreasing the gas speed, the proportion of reducing gases (CO, etc.) is increased. Similarly, by increasing the relative proportion of sulphur dioxide in the gas treated, decreasing the temperature of the fuel bed, or increasing the gas speed, the proportion of reducing gases will be reduced. It will be obvious, however, to one skilled in the art that these several factors are not independently controllable. While any of these factors may be controlled to some extent, in ordinary practice, certain of them will be determined by economic conditions and by the type of apparatus employed. Thus, for example, the gas speed through the reduction chamber is determined by the design of such chamber and by the means employed for the movement of the gases. Usually the gas speed will be comparable to gas speeds normally employed in the art of manufacturing producer gas. Likewise, the type of fuel, whether coke, anthracite, or bituminous coal, will be determined by economic conditions, location of installation, etc. One factor, however, which influences the composition of the reduction products to a major extent and which varies quite widely is the composition of the sulphur dioxide gas to be treated. Reducing the proportion of the carbon monoxide (CO) in the reduction products by controlling the above mentioned factors was highly desirable for efficient operation of the processes as heretofore known, and consequently relatively strong sulphur dioxide gas was employed where available, or if unavailable, sulphur dioxide from weak gases was concentrated prior to treatment. In contra-distinction to this method of operation, the present invention contemplates the treatment of relatively weak sulphur dioxide gas, for example 4–7% $SO_2$ such as may be obtained directly from smelting, roasting or other metallurgical processes, with carbonaceous fuel under such conditions that the gaseous products of the reduction will contain a large amount of reducing gas, i. e., such that the ratio by volume of the carbon monoxide to carbon dioxide therein will be substantially 1 to 1 or greater, whereby such gaseous products, when subsequently caused to interact with a further quantity of sulphur dioxide gas, will produce a temperature sufficiently high to burn any soot or other solid carbonaceous matter present. When operating in this manner it is preferable in the interest of fuel economy, though not necessary, to have the strength of the sulphur dioxide gas subsequently introduced greater than that above mentioned, i. e., greater than 4–7%.

We have illustrated a system adapted for carrying out our invention in the accompanying drawings, in which Fig. 1 is a general layout of the system.

Fig. 2 is a sectional view of a suitable type of combustion chamber for use in the system.

In practicing our invention, sulphur dioxide gas is introduced into the reduction chamber 1 (see Fig. 1) through the conduit 8. A suitable valve 10 is provided to control the flow of gas. An air inlet 9 with a control valve 11 is also provided whereby additional air may be introduced into the sulphur dioxide gas entering the reduction chamber. We have found by experiment that when sulphur dioxide gas, such as may be obtained from the roasting of pyrites with air, has a sulphur dioxide content of about 7% by volume and the gas, at atmospheric temperature, is contacted with incandescent carbonaceous fuel at a gas speed comparable with the gas speeds employed in the art of manufacturing producer gas, the carbonaceous fuel is maintained at the optimum temperature for the reduction and the gaseous products from the reduction will contain substantially all of the carbon in the form of carbon monoxide. Similarly when the entering gas contains less than, but in the neighborhood of, about 12% sulphur dioxide, the gaseous products will contain substantially one half or more of the carbon in the form of carbon monoxide. Hence, where the sulphur dioxide gas contains about 12% sulphur dioxide or less, no additional oxygen in the form of air will be required. In the treatment of sulphur dioxide gas containing more than 12% sulphur dioxide, however, the reduction products under optimum operating conditions will contain an increasing proportion of carbon dioxide and accordingly at times it may be desirable to add air through the inlet 9 to increase the oxygen content of the gas treated to such an extent that the products of the reduction will contain substantially as much carbon monoxide as carbon dioxide. When treating sulphur dioxide gas from other sources but containing percentages of $SO_2$ within the above limits, as for example smelter gas, the percentage of free oxygen in the gas may under some circumstances be less and will have to be increased by the addition of air, unless the temperature of the gas is high enough to supply a considerable amount of heat as sensible heat in the incoming gas to the reduction chamber.

The reduction occurs according to the following typical equations:

(1) $O_2 + C \rightarrow CO_2$
(2) $SO_2 + C \rightarrow CO_2 + S$

The carbon dioxide thus formed reacts with more carbon to form carbon monoxide.

(3) $2CO_2 + 2C \rightarrow 4CO$

The exact proportions of carbon dioxide and carbon monoxide in the reduction products will depend, of course, upon the amount of free oxygen either normally present in the sulphur dioxide gas or added through the inlet 9, provided other conditions of gas speed and temperature of fuel bed remain the same.

But in all events, at least sufficient oxygen will be provided so that, when employing gas speeds and fuel bed temperatures comparable to those used in the art of manufacturing producer gas, the reduction products will contain substantially as much carbon monoxide as carbon dioxide and preferably more. Some carbonyl sulphide may be produced, and if the fuel or gas contains hydrogen in any form, hydrogen sulphide will also be formed.

The gaseous products from the reduction chamber 1 containing the large amount of reducing gas, chiefly carbon monoxide, as well as sulphur vapor, carbonyl sulphide, hydrogen sulphide, nitrogen, etc., are mixed with a further controlled amount of sulphur dioxide gas introduced through the conduit 16 and conducted into a combustion chamber 2 where the interaction of the reducing and reducible gases occurs. The combustion chamber (see Fig. 2) may be constructed in such a manner that the gases entering at 12 first contact with a checkerwork of firebrick 13 to cause thorough mixing and to aid the combustion, and subsequently with porous refractory material 14 such as broken firebrick, broken bauxite brick, or granular bauxite which serves to complete the utilization of the carbon monoxide. The gases are removed through the outlet 15. It should be understood that this type of combustion chamber is shown merely by way of example for the purpose of illustration.

The amount of sulphur dioxide gas added through the conduit 16 will be regulated by the valve 17 to provide approximately interacting proportions of reducing and reducible gases. The composition of the sulphur dioxide gas thus introduced may be the same as that introduced into the reduction chamber, but according to our preferred method a stronger or richer sulphur dioxide gas is employed. In fact, we have found that when the gaseous products from the reduction chamber contain little or no carbon dioxide and large amounts of carbon monoxide that the sulphur dioxide gas added thereto may be as concentrated as desired and that no free oxygen will be required to burn with the carbon monoxide to thereby maintain the desired high temperature for the reaction. This is true since the amount of heat liberated by the combustion of CO to form $CO_2$ is more than twice as much as that liberated by the combustion of carbon to form CO. A sulphur dioxide gas containing 10 to 14% sulphur dioxide and 3 to 8% oxygen, such as may be obtained from the roasting of sulphide ores or concentrates which are high in sulphur with air or with a weak $SO_2$ gas, will be found satisfactory, and likewise a more highly concentrated gas such as that obtained by the absorption of sulphur dioxide from weak gas in water, tar oils, or other suitable solvent, or by adsorption in such substances as activated carbon, activated bauxite, etc., with subsequent liberation by heat, may be advantageously employed. By employing a rich or concentrated gas containing but a small amount of or no free oxygen, and hence relatively poorer in free oxygen than the gas entering the reduction chamber, the efficiency of the process is greatly increased, since substantially all of the carbon monoxide or other reducing gas generated in the reduction chamber is utilized in the reduction of sulphur dioxide to elemental sulphur. Furthermore, the temperature obtained in the combustion chamber by the burning of the considerable amounts of carbon monoxide is still sufficient to cause the oxidation with sulphur dioxide and carbon dioxide of any soot or other carbonaceous particles carried over in the gaseous products from the reduction chamber and to thereby cleanse the gas and render the elemental sulphur produced substantially free from such contamination. The interaction of the reducing and reducible gases occurs according to the following typical equations:

$$2CO + SO_2 \rightarrow 2CO_2 + S$$
$$2H_2S + SO_2 \rightarrow 2H_2O + 3S$$
$$2COS + SO_2 \rightarrow 2CO_2 + 3S$$

The elemental sulphur in the gaseous products from the combustion chamber, produced in accordance with the present invention, may be recovered in any suitable manner or the gaseous products may undergo further treatment as desired. For example they may be cooled as desired in the cooler 3 and contacted with a suitable catalyst such as activated bauxite, iron oxide, pyrites cinder, etc., in the chamber 4 to complete the interaction of the reducing and reducible gases and more particularly to cause the complete interaction of any hydrogen sulphide with sulphur dioxide. According to a preferred method, the gaseous products are cooled to as low a temperature as possible without causing the elemental sulphur to be condensed and retained by the catalytic material in the chamber 4. The elemental sulphur in the gases coming from the chamber 4 is then condensed in the cooler 5 and collected by suitable means 6 such as a baffle chamber with fixed or rotating baffles, washer, coke filter, or the like. If the remaining gases still contain any sulphur compounds, they may be contacted with activated carbon or the like in the chamber 7 to remove the last traces of such compounds and any elemental sulphur present.

It is to be noted in carrying out our invention according to our preferred method, employing a highly concentrated $SO_2$ gas for reaction with the CO first formed, that a considerably increased amount of sulphur is produced in the combustion chamber with respect to that formed in the reduction chamber than in the prior practice. Also, the labor required per unit of sulphur produced is less than that normally required, since the operation of the combustion chamber requires little or no care. Furthermore, by employing a concentrated $SO_2$ gas with low oxygen content in the combustion chamber, the production of sulphur per unit of carbon burned is thereby increased.

By the term "sulphur dioxide" or "sulphur dioxide gas" as used throughout the specification and claims, we intend to include any mixture of sulphur dioxide with oxygen, nitrogen, etc.

Various modifications may be made in the manner of carrying out our invention. For example, if the sulphur dioxide gas is preheated, the gas may be relatively richer in sulphur dioxide and relatively poorer in free oxygen than indicated and the gaseous products of the reduction will still contain a maximum amount of reducing gas. We do not, therefore, wish to limit the scope of our invention except as defined in the appended claims.

We claim:

1. The improvement in the process of producing elemental sulphur by the reduction of sulphur dioxide with carbonaceous fuel which comprises contacting a mixture of sulphur dioxide gas in amount not substantially greater than 12% and oxygen with carbonaceous fuel at an elevated temperature, regulating the proportions of sulphur dioxide and free oxygen in the entering gas whereby a major portion of the carbon is utilized in the production of carbon monoxide, adding sulphur dioxide gas to the products of the reduction, said sulphur dioxide gas having a sulphur dioxide content relatively greater than that of the sulphur dioxide gas contacted with said carbonaceous fuel, regulating the amount of relatively stronger sulphur dioxide gas so added to provide approximately interacting proportions of reducing and reducible gases, and causing the interaction of such mixed gases.

2. The improvement in the process of producing elemental sulphur by the reduction of sulphur dioxide with carbonaceous fuel, which comprises contacting a mixture of sulphur dioxide in amount not substantially greater than 12% and oxygen with carbonaceous fuel at an elevated temperature, regulating the proportions of the sulphur dioxide and oxygen in the entering gas, whereby substantially all of the carbon of the fuel is utilized for the production of carbon monoxide, adding sulphur dioxide gas to the gaseous products of the reduction to provide approximately interacting proportions of reducing and reducible gases, said sulphur dioxide gas being relatively richer in sulphur dioxide and relatively poorer in free oxygen with respect to said gas entering said reduction chamber, and causing the interaction of such mixed gases.

3. The improvement in the process of producing elemental sulphur by the reduction of sulphur dioxide with carbonaceous fuel which comprises contacting a mixture of sulphur dioxide gas and oxygen with carbonaceous fuel at an elevated temperature, regulating the proportions of sulphur dioxide and free oxygen in the entering gas by the addition of air to provide approximately 7% by volume of sulphur dioxide, adding sulphur dioxide gas to the gaseous products of the reduction to provide approximately interacting proportions of reducing and reducible gases, said sulphur dioxide gas being relatively richer in sulphur dioxide and relatively poorer in free oxygen with respect to said gas entering said reduction chamber, and causing the interaction of such mixed gases.

4. The improvement in the process of producing elemental sulphur by the reduction of sulphur dioxide with carbonaceous fuel which comprises contacting a mixture of sulphur dioxide in amount not substantially greater than 12% and oxygen with carbonaceous fuel at an elevated temperature, adding sulphur dioxide gas to the gaseous products of the reduction, said sulphur dioxide gas being relatively richer in sulphur dioxide and relatively poorer in free oxygen with respect to said gas entering said reduction chamber, and causing the interaction of such mixed gases.

5. The improvement in the process of producing elemental sulphur by the reduction of sulphur dioxide gas with carbonaceous fuel which comprises contacting one portion of a gas containing sulphur dioxide in amount not substantially greater than 12% and oxygen with carbonaceous fuel at an elevated temperature, under such conditions that the gaseous products of the reduction contain at least as much carbon monoxide as carbon dioxide, treating another portion of the gas to concentrate the sulphur dioxide therein, adding this concentrated sulphur dioxide gas to said gaseous products of the reduction to provide approximately interacting proportions of reducing and reducible gases and causing the interaction of such mixed gases.

In testimony whereof, we affix our signatures.

RAYMOND C. BENNER.
ALFRED PAUL THOMPSON.

CERTIFICATE OF CORRECTION.

Patent No. 1,836,357. Granted December 15, 1931, to

RAYMOND C. BENNER ET AL.

It is hereby certified that error appears in the printed specification of the above numbered patent requiring correction as follows: Page 1, lines 5 and 6, strike out the words "in amount not substantially greater than 12%", and line 92, for "it" read is; and that the said Letters Patent should be read with these corrections therein that the same may conform to the record of the case in the Patent Office.

Signed and sealed this 16th day of February, A. D. 1932.

(Seal)

M. J. Moore,
Acting Commissioner of Patents.